United States Patent [19]  
Hihara et al.

[11] Patent Number: 4,960,871  
[45] Date of Patent: Oct. 2, 1990

[54] FIBER-REACTIVE HALOTRIAZINE PYRIDINE-BASED MONOAZO COLORANT

[75] Inventors: Toshio Hihara; Yukiharu Shimizu, both of Kitakyushu, Japan

[73] Assignee: Mitsubishi Chemical Industries Inc., Japan

[21] Appl. No.: 313,316

[22] Filed: Feb. 17, 1989

Related U.S. Application Data

[63] Continuation of Ser. No. 38,543, Apr. 15, 1987, abandoned.

[30] Foreign Application Priority Data

Apr. 17, 1986 [JP] Japan .................... 61-87141

[51] Int. Cl.[5] .................... C09B 62/04; C09B 62/005; D06P 1/382; D06P 3/66
[52] U.S. Cl. .................... 534/635; 8/549; 534/630
[58] Field of Search .................... 535/635, 630; 8/549

[56] References Cited

U.S. PATENT DOCUMENTS

| 4,473,499 | 9/1984 | Niwa et al. ............ 534/635 X |
| 4,500,455 | 2/1985 | Niwa et al. ............ 534/635 |
| 4,515,716 | 5/1985 | Niwa et al. ............ 534/635 |
| 4,626,590 | 12/1986 | Niwa et al. ............ 534/635 |
| 4,707,546 | 11/1987 | Niwa et al. ............ 534/635 |

FOREIGN PATENT DOCUMENTS

| 121825 | 10/1984 | European Pat. Off. ............ 534/635 |
| 131314 | 3/1985 | European Pat. Off. ............ 534/635 |
| 3227253 | 7/1982 | Fed. Rep. of Germany ...... 534/635 |
| 60-112862 | 6/1985 | Japan ........................... 534/635 |
| 61-181865 | 8/1986 | Japan ........................... 534/635 |

OTHER PUBLICATIONS

Chemical Abstracts 103(1985) No. 18, p. 71, #143356b Mitsubishi.

*Primary Examiner*—Floyd D. Higel  
*Attorney, Agent, or Firm*—Jordan B. Bierman

[57] ABSTRACT

Monoazo colorants represented by the general formula (I):

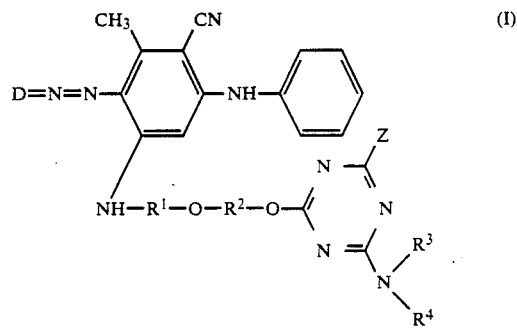

wherein:  
D represents

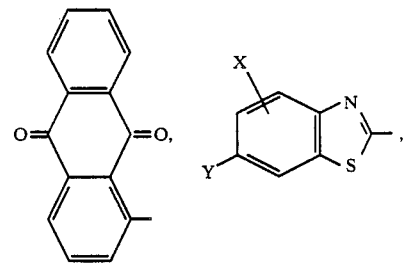

(wherein X represents a hydrogen atom or a halogen atom, and Y represents a nitro group, a lower alkylsulfonyl group, a thiocyanic acid group or a halogen atom), or

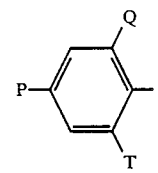

(wherein P represents a nitro group or a lower alkylsulfonyl group, and Q and T each represents a hydrogen atom, a halogen atom or a cyano group); $R^1$ and $R^2$ each represents an ethylene group or a propylene group; $R^3$ and $R^4$ each represents a hydrogen atom or an alkyl group which may be substituted by a lower alkoxy group or a lower alkoxyalkoxy group; and Z represents a halogen atom.

This monoazo colorants include a reactive type pyridine-based monoazo dye suitable for use in dyeing of cellulose or cellulose/polyester mixed fibers in red to orange.

9 Claims, No Drawings

FIBER-REACTIVE HALOTRIAZINE PYRIDINE-BASED MONOAZO COLORANT

This application is a continuation application Ser. No. 038,543, filed Apr. 15, 1987, now abandoned.

FIELD OF THE INVENTION

The present invention relates to monoazo colorants. More particularly, it is a reactive pyridine-based monoazo colorants suitable for dyeing cellulose (cotton) and mixed fibers of cellulose and polyester in orange to red color.

BACKGROUND OF THE INVENTION

Reactive pyridine-based monoazo colorants having the formulae (1) and (2) as shown below have been known to be colorants having excellent light fastness and wet colored fastness which permit dyeing of mixed fibers of cellulose and polyester.

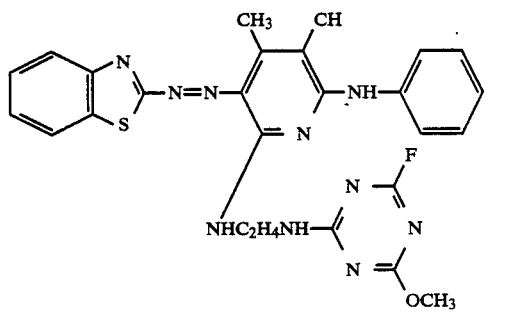
(1)

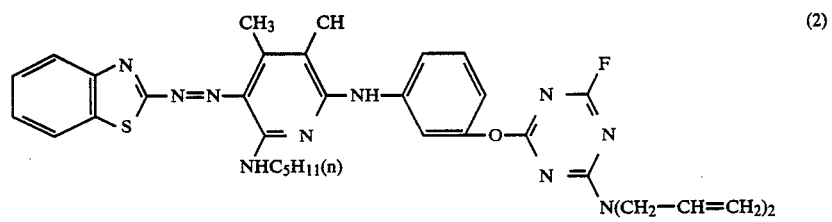
(2)

The monoazo colorants of formulae (1) and (2) are disclosed in Japanese Patent Application (OPI) Nos. 15558/83, and 47060/83, respectively.

The term "OPI" as used herein means a "published unexamined patent application".

The colorants having the formula (1), however, have a problem in that the rubbing fastness after dyeing is poor because in dyeing mixed fibers of cellulose and polyester in dense color, the dyeing ability is insufficiently low and thus colorants not completely dyed remain on the fiber surface.

On the other hand, the colorants having the formula (2) have a problem in that in dyeing of mixed fibers of cellulose and polyester in dense color, the solvent fastness e.g., resistance against dry cleaning is poor although the rubbing fastness is relatively acceptable.

SUMMARY OF THE INVENTION

An object of the present invention is to provide an orange to red monoazo colorants excellent in both the rubbing fastness and solvent fastness.

The present invention relates to a monoazo colorants represented by the general formula (I):

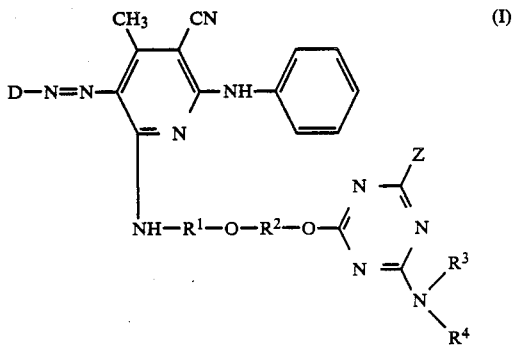

wherein:
D represents

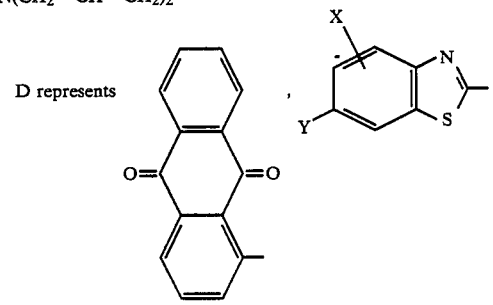

(wherein X represents a hydrogen atom or a halogen atom; and Y represents a nitro group, a lower alkylsulfonyl group, a thiocyanic acid group or a halogen atom), or

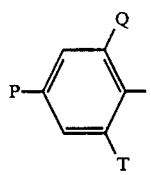

(wherein P represents a nitro group or a lower alkylsulfonyl group; and Q and T each represents a hydrogen atom, a halogen atom or a cyano group;
$R^1$ and $R^2$ each represents an ethylene group or a propylene group;
$R^3$ and $R^4$ each represents a hydrogen atom or an alkyl group which may be substituted by a lower alkoxy group or a lower alkoxyalkoxy group; and Z represents a halogen atom.

DETAILED DESCRIPTION OF THE INVENTION

The colorants represented by the general formula (I) have two structural features. One of the features is that the triazine ring is linked to the pyridine ring of the coupler through a bonding group of —NH—$R^1$—O—$R^2$—O—. The other is that the monoazo colorants contain a specified diazo component and the pyridine ring of the coupler is substituted by three groups consisting of a methyl group, a cyano group and a group of

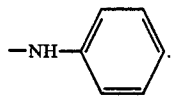

The diazo component is particularly preferably a benzothiazole component.

The monoazo colorants of the present invention are basically water-insoluble and of the same type as disperse dyes which have been heretofore been used as colorants for polyester fibers. The monoazo colorants of the present invention, however, are different from the conventional disperse dyes since the colorants additionally have a group capable of reacting with a cellulose fiber such as halogenotriazine in the structure thereof. That is, the monoazo colorants of the present invention are a new type of colorants so-called as "reactive disperse dye".

In the monoazo colorants represented by the above general formula (I), the halogen atom represented by X, Y, Q and T includes a chlorine atom, a bromine atom and a fluorine atom. Particularly preferred is a chlorine atom.

The lower alkylsulfonyl group represented by Y and P includes a methylsulfonyl group, an ethylsulfonyl group, a propylsulfonyl group and a butylsulfonyl group.

The halogen atom represented by Z includes a fluorine atom, a chlorine atom and a bromine atom. Particularly preferred is a fluorine atom.

The alkyl group represented by $R^3$ and $R^4$ is an alkyl group having 1 to 8 carbon atoms, such as a methyl group, an ethyl group, a straight or branched propyl group, a butyl group, a pentyl group, a hexyl group, a heptyl group and an octyl group, or an alkyl group substituted by a lower alkoxy group or lower alkoxyalkoxy group, such as a 3-methoxypropyl group, and ethoxyethyl group, a 3-ethoxypropyl group, a 3-propoxypropyl group, a 3-isopropoxypropyl group, a 3-butoxypropyl group, a butoxyethyl group, a 3-isobutoxypropyl group, a methoxyethoxyethyl group and an ethoxypropoxypropyl group.

As the group

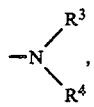

a monoalkyl group substituted by a lower alkoxy group is particularly preferred.

The monoazo colorants represented by the general formula (I) can be easily prepared by diazotizing an amine compound represented by the general formula (II):

D—$NH_2$ wherein D is as defined above) by known techniques and then coupling the diazotized amine compound to a compound represented by the general formula (III)

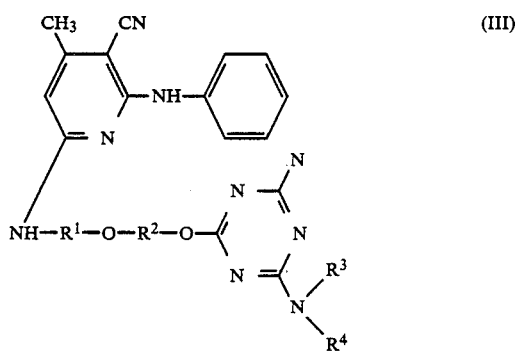

(wherein $R^1$, $R^2$, $R^3$, $R^4$ and Z are as defined above).

In preparing the coupling component, a compound having the formula:

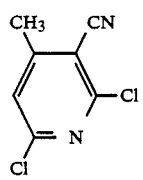

is first reacted with aniline and then reacted with a compound represented by the general formula (IV):

$NH_2R^1$—O—$R^2$—OH       (IV)

(wherein $R^1$ and $R^2$ are as defined above) to form a compound represented by the general formula (V):

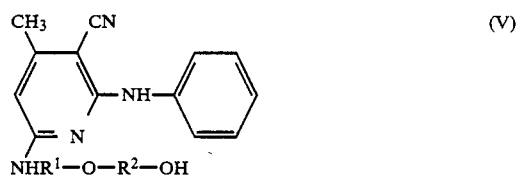

(wherein $R^1$ and $R^2$ are the same as defined above). In this case, a small amount of a compound represented by the general formula (VI):

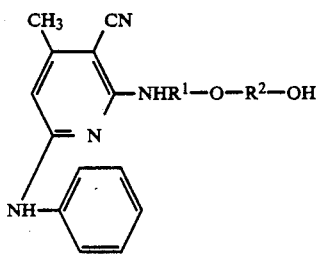

is contained. In some cases, therefore, the coupling component contains, as well as the compound of the general formula (III), a small amount, e.g., not more than 10 wt% of the compound represented by the general formula (III') shown below. Even with this coupling component, the effects of the present invention can be obtained. General Formula (III')

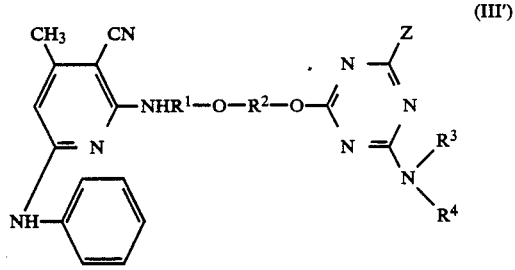

(wherein $R^1$, $R^2$, $R^3$, $R^4$ and Z are as defined above).

The monoazo colorants of the present invention are available for a various applications; for example, it can be used as colorants for dyeing of fibers and cloth, colorants for coloring of paper and plastics, or colorants such as an ink for an ink jet type printer. In general, the colorants of the present invention are mainly used as a dye.

Thus the present invention will hereinafter be explained with reference to the case that the colorants of the present invention are used as monoazo colorants.

Fibers which can be dyed with the colorants of the present invention include fibers of cellulose (cotton), flax, etc.; viscose rayon, copper ammonia rayon, etc.; partially aminated or partially acylated cellulose; polyester, polyamide, nylon, wool, silk, polyurethane, cellulose diacetate, cellulose triacetate, etc.; and cloth, mix spinned cloth, mix woven cloth, knit cloth, etc. produced of the above fibers. These are hereinafter referred to as "fibers".

The colorants of the present invention are particularly useful in dyeing of cellulose-polyester mixed fibers. That is, the colorants of the present invention act both as a disperse dye and a reactive dye, and thus can be used to dye cellulose and polyester at the same time.

In the practice of dyeing, it is desirable for the colorants of the general formula (I) to be finely dispersed in a medium in the size of about from 0.5 to 2 μm. For this purpose, the following methods can be employed.

(1) The colorants are finely dispersed in water using, for example, a Pluronic type nonionic surface active agent or a water-soluble dispersing agent composed of an anionic dispersing agent such as sodium ligninsulfonate and the sodium salt of a naphthalenesulfonic acid-formalin condensate and by the use of a pulverizing machine such as a sand mill.

(2) The colorants are finely dispersed in an organic solvent such as alcohols, ketones, hydrocarbons, halogenated hydrocarbons, esters, ethers or mixtures thereof using, for example, compounds obtained by adding a low mol of ethylene oxide to sulfosuccinic acid esters, nonylphenol and the like.

(3) The colorants are finely dispersed in a mixed solvent of water and a solvent compatible with water in any ratio, among the above solvents.

At the above fine dispersion step, for example, polymer compounds soluble in the dispersion medium or surface active agents having a function other than dispersibility may be added.

This fine dye dispersion can be used as it is as a dye bath for use in the dip dyeing method and the padding dyeing method, and further as a color paste for use in the print dyeing method.

In general, the fine dye dispersion prepared by the above method is diluted with water, aqueous solutions of organic solvents, petroleum hydrocarbons, halogenated hydrocarbons, etc. to the desired dyeing concentration to form an O/W type or W/O type emulsion, and is used as a dip dyeing bath, a padding dyeing bath or a print dyeing color paste.

In preparation of the dip dyeing bath, padding dyeing bath or print dyeing color paste, an alkali metal compound or an alkali precursor compound generating an alkali on heating in the presence of water, for example, can be added as an acid binder. The acid binder is usually used in such an amount that the pH of the dip dyeing bath, padding dyeing bath or print dyeing color paste is within the range of from 7.5 to 9.0.

In the case of dyeing fibers containing cellulose, it is preferred that a cellulose fiber swelling agent be added to the bath or color paste. The amount of the cellulose fiber swelling agent used is from 5 to 25 wt%, preferably from 6 to 12 wt% of the bath or color paste.

In dyeing the above fibers with the colorants of the present invention, known techniques can be employed. For example, the fibers are impregnated or printed with the dyeing bath or color paste prepared by the above method, dried and subjected to heat treatment, and thereafter washed with hot water containing a surface active agent.

A relation between a preferred dyeing method using the colorants of the present invention and fibers is shown in Table 1.

TABLE 1

| Dyeing Method | Fibers | | | | |
|---|---|---|---|---|---|
| | Cellulose | Polyamide or Polyester | Polyester/ Cellulose | Polyamide/ Cellulose | Polyester/ Silk |
| Dip Dyeing | Fairly good | Good | Fairly good | Fairly good | Good |
| Padding Dyeing | Good | Good | Good | Good | Good |
| Print Dyeing | Good | Good | Good | Good | Good |

Fibers dyed in orange to red color which are vivid and uniform in dyeing, good in light fastness and further excellent in rubbing fastness and solvent fastness can be obtained by dyeing with the colorants of the present invention.

The present invention is described in greater detail with reference to the following examples.

| | |
|---|---|
| Monoazo dye having the formula: 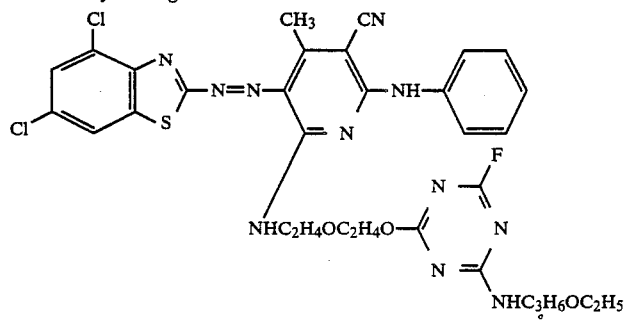 | 15 g |
| Nonionic dispersing agent (Newcol 710F produced by Nippon Nyukazai Co., Ltd.) | 5 g |
| Ligninsulfonic acid-based anionic dispersing agent | 4 g |
| Ethylene glycol | 5 g |
| Water | 71 ml |

A dye composition having the above constituents was finely dispersed by the use of a paint shaker as a fine dispersing machine to prepare a dye dispersion.

Using the above dye dispersion, a print dyeing color paste (pH=8.0) having the following constituents was prepared.

| | |
|---|---|
| Dye dispersion | 10 g |
| Sodium alginate-based O/W emulsion paste | 55 g |
| CH$_3$O—(C$_2$H$_4$O)$_6$—H | 6 g |
| Water to make | 100 g |

The print dyeing color paste was printed on a polyester/cotton (65/35) mix spinned cloth by the use of a screen print dyeing machine, was subjected to intermediate drying at 80° C. for 3 minutes followed by fixing at 185° C. for 7 minutes by the use of a H.T.S. machine (high temperature steam fixing machine). Thereafter the cloth was washed with water and then washed with a washing liquid containing 2 g/l of a nonionic surface active agent (Lipotoll TC-300 produced by Nikka Kagaku Co., Ltd.) and 1 g/l of sodium carbonate at a bath ratio of 1:30 at 80° C. for 10 minutes to obtain a vivid red-dyed cloth.

The dyed cloth was tested for light fastness, rubbing fastness and dry cleaning fastness by the following methods according to a Japanese Industrial Standard (JIS).

Light fastness: According to JIS L-0842
Rubbing fastness: According to JIS L-0849
Dry cleaning fastness: According to JIS L-0860

The results are shown in Table 2.

The dye used in this example was prepared as follows:

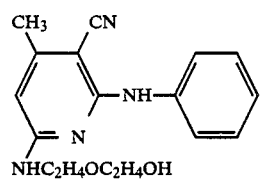

was added to 140 g of acetone and cooled to −5° C., and then 9.7 g of trifluorotriazine was gradually added and stirred for 1 hour. Then 7.2 g of triethylamine was added and stirred for 30 minutes. In addition, 8.0 g of ethoxypropylamine was added to obtain an acetone solution of a compound having the following formula:

560 g of methanol was added to the above solution to prepare a coupling solution.

On the other hand, 15.7 g of 4,6-dichlorobenzothiazole was added to 120 g of acetic acid and 200 g of phosphoric acid, and 25.1 g of 47% nitrosylsulfuric acid was added at a temperature of from 0° to −3° C. and stirred to achieve diazotization.

The diazo solution thus obtained was gradually added to the above coupling solution while controlling the temperature to not higher than 0° C. and the pH within the range of 2 to 4. After stirring for 2 hours, crystals precipitated were separated by filtration, washed with water and dried to obtain 46 g of red crystals.

λmax (DMF) of the crystals was 508 nm.

COMPARATIVE EXAMPLES 1 TO 3

With comparative dyes having the formulae shown in Table 2, dyeing was performed in the same manner as in Example 1, and the dyed cloth was evaluated in the same manner as in Example 1.

The results are shown in Table 2.

TABLE 2

| | Chemical Formula | Light Fastness | Rubbing Fastness (Dry) | Dry Cleaning Fastness (Discoloration) |
|---|---|---|---|---|
| Example 1 | [structure: 4,6-dichlorobenzothiazole-N=N-pyridine ring with CH$_3$, CN, NHPh, NHO$_2$H$_4$OC$_2$H$_4$O-triazine with F and NHO$_3$H$_6$OC$_2$H$_5$] | 5 | 5$^-$ | 5$^-$ |
| Comparative Example 1* | [structure: benzothiazole-N=N-pyridine with CH$_3$, CN, NHPh, NHC$_2$H$_4$NH-triazine with F and OCH$_3$] | 4–5 | 3–4 | 4–5 |
| Comparative Example 2 | [structure: 4,6-dichlorobenzothiazole-N=N-pyridine with CH$_3$, CN, NHPh, NHC$_2$H$_4$NH-triazine with F and OCH$_3$] | 5 | 3 | 4–5 |
| Comparative Example 2** | [structure: benzothiazole-N=N-pyridine with CH$_3$, CN, NHO$_5$H$_{11}$(n), NH-phenyl-O-triazine with F and N(CH$_2$-CH=CH$_2$)$_2$] | 4–5 | 5$^-$ | 3 |

*Example of Japanese Patent Application (OPI) No. 15558/83.

**Example of Japanese Patent Application (OPI) No. 47060/83.

EXAMPLE 2

15 g of monoazo colorants having the formula:

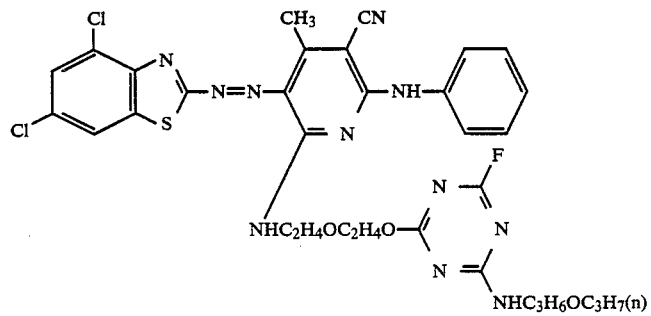

5 g of polyoxyethylene glycol nonylphenyl ether (HLB 13.3), and 3 g of a naphthalenesulfonic acid-formaldehyde condensate were finely dispersed in 77 ml of water by the use of a sand mill to prepare a dye dispersion.

Using this dye dispersion, a padding bath having the following constituents was prepared.

| Dye dispersion | 13 g |
|---|---|
| $CH_3O-(C_2H_4O)_9-H$ | 80 g |
| Ammonium sulfate | 1 g |
| Water to make | 100 g |

Polyester/cotton (65/35) mix spinned cloth was impregated with the above padding bath and wrung a water at a squeezing rate of 65% and, thereafter, dried at 100° C. for 2 minutes and heated at 210° C. for 1 minute to fix the dye.

The above cloth was soaked in an alkali bath having the following constituents:

| Sodium m-nitrobenzenesulfonate | 0.8 g |
|---|---|
| Sodium hydroxide | 1 g |
| Water to make | 100 g | was wrung at a squeezing rate of 60%, and then was subjected to steaming treatment at 100° C. for 45 seconds.

Then the cloth was washed with water and cleaned in the same manner as in example 1 to obtain a red dyes cloth having the following properties:

| Light fastness | Class 5 |
|---|---|
| Rubbing fastness (dry) | Class 5− |
| Dry cleaning fastness | Class 5− |

(disclo ration)

The dye used in this example was prepared in the same manner as in Example 1, and λmax (DMF) of the cake was 508 nm.

EXAMPLE 3

10 g of a monoazo dye having the following structural formula:

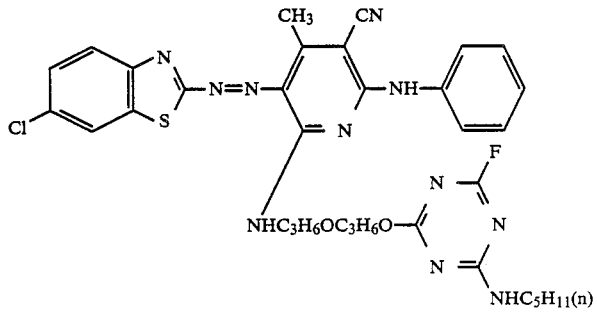

and 25 g of a naphthalenesulfonic acid-formaldehyde condensate were finely dispersed in 65 ml of water by the use of a sand mill to prepare a dye dispersion.

Using this dye dispersion, a dyeing bath (pH 8.0) having the following constituents was prepared.

| Dye dispersion | 2 g |
|---|---|
| Water to make | 300 g |

10 g of Nylon taffeta was dipped in the above dyeing bath (pH 8.0), heated gradually from room temperature to 95° C. and dyed at this temperature for 1 hour.

The Nylon taffeta was subjected to the same cleaning treatment as in Example 1 to obtain a red dyed product having the following properties:

| Light fastness | Class 5 |
|---|---|
| Dry cleaning fastness | Class 5 |

The dye used in this example was prepared in the same manner as in Example 1, and λmax (DMF) of the cake was 504 nm.

EXAMPLE 4

15 g of a (about 1:1) mixture of monoazo colorants having the following formulae:

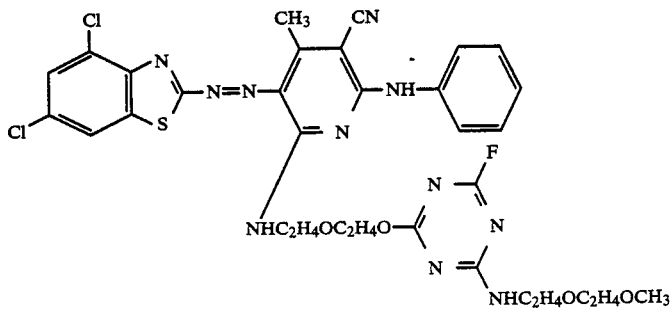

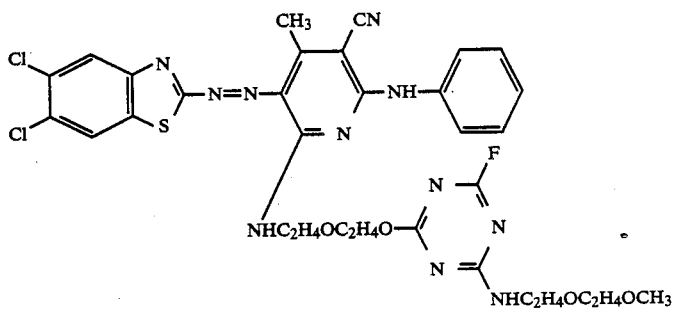

and 10 g of a Pluronic surface active agent (Pluronic L64 produced by Asahi Denka Kogyo Co., Ltd.) were finely dispersed in 75 ml of water by the use of a sand mill as a fine dispersion machine to prepare a dye dispersion.

Using this dye dispersion, a print dyeing color paste (pH 8.0) having the following constituents was prepared.

| Dye dispersion | 8 g |
| 5% Aqueous solution of sodium alginate | 55 g |
| Polyethylene glycol diacetate having an average molecular weight of 400 | 10 g |
| Water to make | 100 g |

A cotton broad (cotton yarn number: 40) subjected to mercerization was print-dyed with the above print dyeing color paste (pH 8.0) by the use of a screen print dyeing machine, was subjected to intermediate drying at 80° C. for 3 minutes, and followed by subjecting to a treatment using superheated steam at 185° C. for 7 minutes.

Thereafter the same cleaning treatment as in Example 1 was applied to obtain a red-dyed product having the following properties:

| Light fastness | Class 5 |

The dye used in this example was prepared in the same manner as in Example 1, and λmax (DMF) of the cake was

EXAMPLE 5

15 g of an azo colorants having the formula:

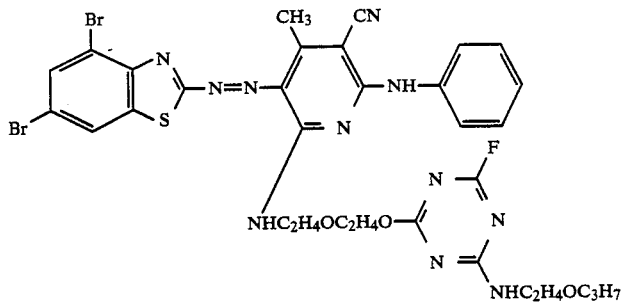

and 15 g of a naphthalenesulfonic acid-formaldehyde condensate were finely dispersed in 70 ml of water to prepare a dye dispersion.

Using this dye dispersion, a padding bath having the following constituents was prepared.

| Dye dispersion | 10 g |
| Water to make | 100 g |

Polyester fiber cloth was impregnated with the above padding bath and wrung a water at a squeezing rate of 45% and, thereafter, dried at 100° C. for 2 minutes, fixed for 7 minutes in superheated steam maintained at 185° C. and then subjected to reduction cleaning by the known procedure to obtain a red-printed cloth having a light fastness of Class 5.

max (DMF) of the dye was 509 nm.

EXAMPLE 6

Polyester/cotton (65/35) mix spinned cloth was dyed with the dyes shown in Table 3 in the same manner as in Example 1 to obtain dyed cloth colored in the colors shown in Table 3.

The dyed cloth was measured for rubbing fastness (dry). The results are shown in Table 3.

TABLE 3

General Formula

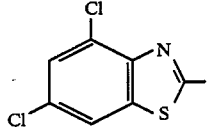

| No. | D | $R^1$ | $R^2$ | $-R^3$ | Hue of Polyester/ Cotton Mix Spinned Cloth | λmax (DMF) | Rubbing Fastness (Dry) |
|---|---|---|---|---|---|---|---|
| 6-1 | 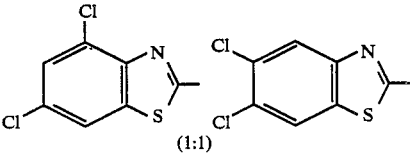 | $C_2H_4$ | $C_2H_4$ | $-C_3H_6OC_4H_9(n)$ | red | 508 | 5− |
| 6-2 | " | " | " | $-C_2H_4OC_2H_4OCH_3$ | " | " | " |
| 6-3 | " | " | " | $-C_3H_6OC_3H_6OC_2H_5$ | " | " | " |
| 6-4 | " | $C_3H_6$ | " | $-C_6H_{13}(n)$ | " | " | " |
| 6-5 | " | $C_2H_4$ | " | $-C_5H_{11}(n)$ | " | " | " |
| 6-6 | 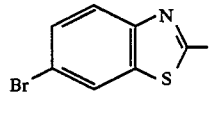 (1:1) | " | " | $-C_8H_{17}(n)$ | " | 507 | " |
| 6-7 | " | " | " | $-C_3H_6OC_3H_7(i)$ | " | " | " |
| 6-8 | " | " | $C_3H_6$ | $-C_2H_5$ | " | " | 4−5+ |
| 6-9 | 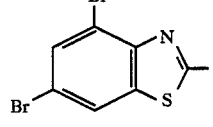 | $C_3H_6$ | " | $-C_3H_6OC_2H_5$ | yellowish red | 505 | 5− |
| 6-10 | 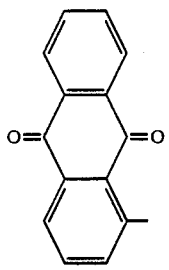 | $C_2H_4$ | $C_2H_4$ | $-C_2H_4OC_4H_9(n)$ | red | 509 | 5− |
| 6-11 | " | " | " | $-C_4H_9(i)$ | " | " | " |
| 6-12 | " | " | " | $-C_3H_6OC_4H_9(n)$ | " | " | " |
| 6-13 |  | " | " | $-C_3H_6OC_2H_5$ | brown | 498 | " |

TABLE 3-continued

General Formula

D—N=N— [pyridine ring with CH₃, CN, NH-phenyl, and NHR¹—O—R²—O—[triazine with F and NHR³] substituents]

| No. | D | R¹ | R² | —R³ | Hue of Polyester/Cotton Mix Spinned Cloth | λmax (DMF) | Rubbing Fastness (Dry) |
|---|---|---|---|---|---|---|---|
| 6-14 | 3-Cl, 4-(H₃CO₂S)-phenyl | " | " | " | orange | 481 | " |
| 6-15 | 2-(6-SO₂C₂H₅-benzothiazolyl) | " | " | " | red | 528 | " |
| 6-16 | 2-(6-NCS-benzothiazolyl) | " | " | " | " | 512 | " |
| 6-17 | 3-CF₃, 4-(O₂N)-phenyl | " | " | " | scarlet | 495 | " |

EXAMPLE 7

Nylon taffeta was dyed with the dyes shown in Table 4 in the same manner as in Example 3 to obtain dyed cloth colored as shown in Table 4. The light fastness and dry cleaning fastness of the dyed cloth were respectively Class 5 and Class 5.

TABLE 4

General Formula

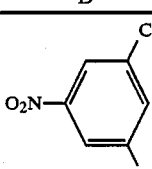

| No. | D | R$^1$ | R$^2$ | R$^3$ | R$^4$ | Z | Color of Nylon Taffeta | λmax (DMF) |
|---|---|---|---|---|---|---|---|---|
| 7-1 | 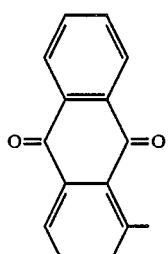 | C$_2$H$_4$ | C$_2$H$_4$ | —C$_2$H$_4$OCH$_3$ | —C$_2$H$_4$OCH$_3$ | —Cl | bluish red | 520 |
| 7-2 | 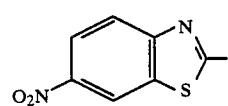 | " | " | —C$_2$H$_5$ | —C$_2$H$_5$ | " | brown | 499 |
| 7-3 | 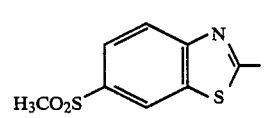 | " | " | —H | —C$_2$H$_4$OC$_2$H$_5$ | —Br | bluish red | 551 |
| 7-4 | " | " | " | " | " | —Cl | " | " |
| 7-5 | 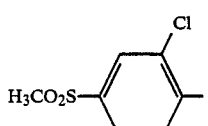 | " | C$_3$H$_6$ | —C$_2$H$_5$ | —C$_2$H$_4$OC$_4$H$_9$ | " | red | 528 |
| 7-6 | 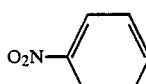 | C$_3$H$_6$ | C$_2$H$_4$ | —H | —C$_4$H$_9$ | —F | orange | 480 |
| 7-7 | " | " | " | " | —C$_3$H$_6$OCH$_3$ | " | " | " |
| 7-8 | O$_2$N—⟨⟩— | " | " | " | " | —Cl | " | 481 |

EXAMPLE 8

Print dyeing was performed in the same manner as in Example 1 except that the polyester/cotton (65/35) mix spinned cloth was replaced with polyester/silk (65/35) mix spinned cloth, thereby obtaining a sharp red-dyed product.

The dyed product shows excellent color fastness in light fastness, rubbing fastness and dry cleaning fastness.

While the invention has been described in detail and with reference to specific embodiment thereof, it will be apparent to one skilled in the art that various changes and modifications can be made therein without departing from the spirit and scope thereof.

What is claimed is:

1. A monoazo colorant represented by the formula

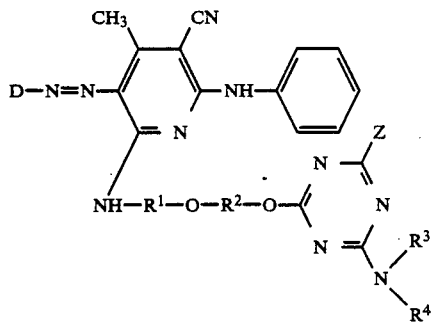

wherein:

D represents

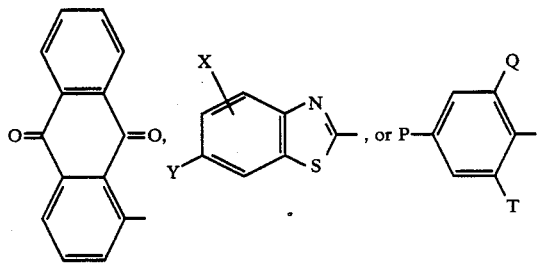

wherein X represents hydrogen or halogen, and Y represents nitro, lower alkylsulfonyl, thiocyanato, or halogen, P represents nitro or lower alkylsulfonyl, and Q and T each represents hydrogen, halogen, or cyano;

$R^1$ and $R^2$ each independently represents ethylene or propylene;

$R^3$ and $R^4$ each independently represents hydrogen, alkyl, or alkyl substituted by lower alkoxy or lower alkoxy alkoxy, and Z represents halogen.

2. The monoazo colorant of claim 1 wherein the colorant is represented by the formula

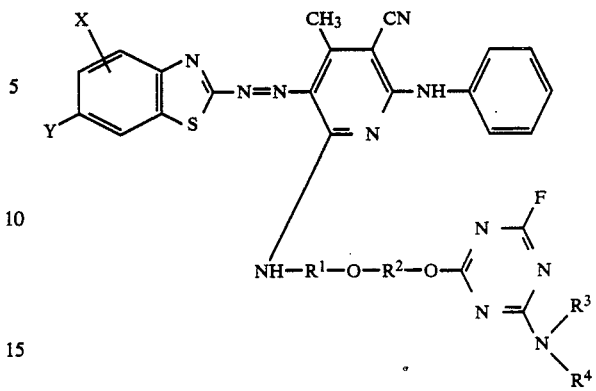

wherein
X represents hydrogen or halogen;
Y represents nitro, lower alkylsulfonyl, thiocyanato or halogen;
$R^1$ and $R^2$ each represents ethylene or propylene; and
$R^3$ and $R^4$ each represents hydrogen, alkyl, or alkyl substituted by lower alkoxy or lower alkoxy alkoxy.

3. The monoazo colorant of claim 1, wherein the colorant is represented by the formula

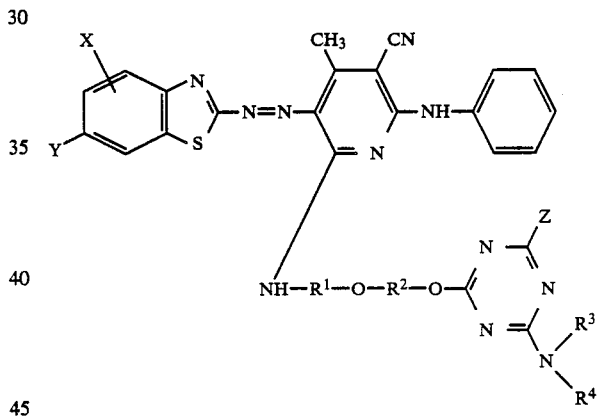

wherein
X represents hydrogen or halogen;
Y represents nitro, lower alkylsulfonyl, thiocyanato or halogen;
$R^1$ and $R^2$ each represents ethylene or propylene;
$R^3$ and $R^4$ each represents hydrogen, alkyl, or alkyl substituted by lower alkoxy or lower alkoxy alkoxy, and Z represents halogen.

4. The monoazo colorant of claim 1 wherein at least one of $R^3$ and $R^4$ are alkyl substituted by lower alkoxy.

5. The monoazo colorant of claim 1 wherein Z is fluorine.

6. The colorant of claim 1 wherein at least one of $R^3$ and $R^4$ is an alkyl substituted by lower alkoxy or lower alkoxy alkoxy.

7. The colorant of claim 2 wherein at least one of $R^3$ and $R^4$ is an alkyl substituted by lower alkoxy or lower alkoxy alkoxy.

8. The monoazo colorant as claimed in claim 4, wherein the colorant is:

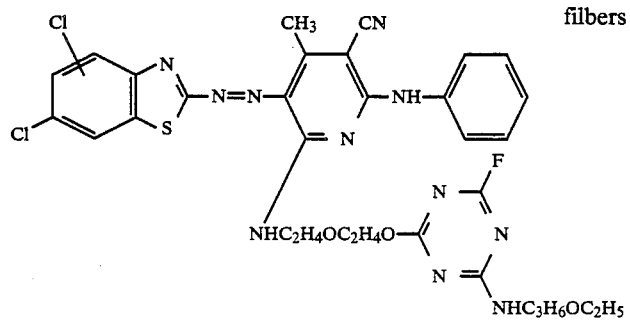
9. A method of dyeing polyester and cellulose mixed filbers using the monoazo colorant of claim 1.